United States Patent

Furukawa et al.

(10) Patent No.: US 6,588,963 B2
(45) Date of Patent: Jul. 8, 2003

(54) COLLECTOR TYPE WRITING INSTRUMENT

(75) Inventors: Kazuhiko Furukawa, Kanagawa (JP); Yojiro Sano, Tokyo (JP)

(73) Assignee: Mitsubishi Pencil Kabushiki Kaisha, Tokyo (JP)

(*) Notice: Subject to any disclaimer, the term of this patent is extended or adjusted under 35 U.S.C. 154(b) by 0 days.

(21) Appl. No.: 10/149,585

(22) PCT Filed: Dec. 15, 2000

(86) PCT No.: PCT/JP00/08918

§ 371 (c)(1),
(2), (4) Date: Jun. 14, 2002

(87) PCT Pub. No.: WO01/43983

PCT Pub. Date: Jun. 21, 2001

(65) Prior Publication Data

US 2003/0072600 A1 Apr. 17, 2003

(30) Foreign Application Priority Data

Dec. 16, 1999 (JP) ............................................. 11-357275

(51) Int. Cl.[7] .................................................. B43K 5/18
(52) U.S. Cl. ........................ 401/225; 401/226; 401/223
(58) Field of Search ................................. 401/223, 224, 401/225, 226, 227, 198

(56) References Cited

U.S. PATENT DOCUMENTS 2,693,172 A * 11/1954 Miessner .................... 401/225
2,931,339 A * 4/1960 Thomas ...................... 401/226
6,302,610 B2 * 10/2001 Mito et al. .................. 401/225

FOREIGN PATENT DOCUMENTS

| JP | 59-184682 U | 12/1984 |
|---|---|---|
| JP | 3-31580 Y2 | 7/1991 |
| JP | 3-31581 Y2 | 7/1991 |
| JP | 4-227886 A | 8/1992 |
| JP | 6-36886 U | 5/1994 |
| JP | 6-36886 | 5/1994 |
| JP | 6-72671 U | 10/1994 |
| JP | 9-104194 A | 4/1997 |
| WO | WO 99/56969 A1 | 11/1999 |

* cited by examiner

Primary Examiner—David J. Walczak
(74) Attorney, Agent, or Firm—Burns, Doane, Swecker & Mathis, LLP (57) ABSTRACT

A collector type writing instrument including: a collector for temporarily storing ink therein upon a change in inter pressure, a sectioning portion for substantially separating its ink tank for storing ink, and a snorkel having a vent portion for establishing air communication between the front and rear spaces divided by the sectioning portion or an ink absorber for reducing the inner tank volume, wherein the snorkel or the cladding of the ink absorber is molded of the same material as the collector or the ink tank is or is subjected to the same wettability reforming treatment as the collector or the ink tank is.

4 Claims, 5 Drawing Sheets

COLLECTOR TYPE WRITING INSTRUMENT

TECHNICAL FIELD

The present invention is directed to improvement of so-called collector type writing instruments, such as ballpoint pens, felt tip pens, markers, fountain pens, small-tube writing instruments and the like, having a writing point at the front end thereof, an ink tank for directly storing ink and a collector or grooved adjuster for absorbing variation in internal pressure. In particular, the present invention relates to improvement of the mechanism to solve the flooding problem occurring when a collector type writing instrument is used under conditions in which a sharp pressure variation occurs such as on an airplane and its bad appearance when parts are incorporated in the ink tank.

BACKGROUND ART

Figure 5:
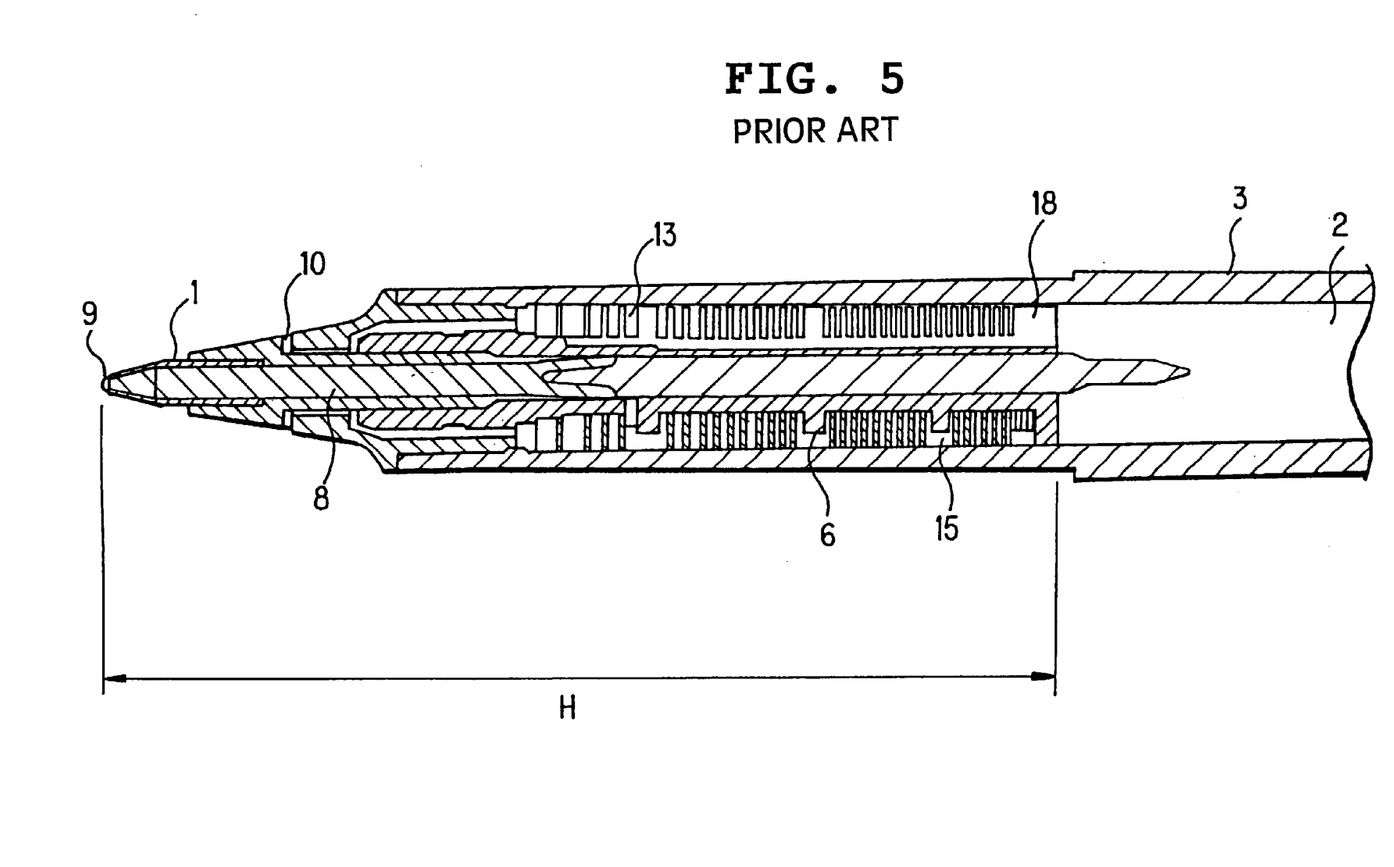
FIG. 5 is a vertical sectional view showing a conventional writing instrument.

Writing instruments which have a collector 6 as an internal pressure adjuster, disposed between a conventionally existing point assembly 1 and ink tank 3, for retaining free-state ink 2 and adjusting the pressure inside ink tank 3 so as to prevent ink leakage from a tip 9 of point assembly 1 and ink flooding from an air hole 10 have been known (see FIG. 5).

A collector type writing instrument can adjust the internal pressure balance by temporarily storing ink 2 of a relatively low viscosity from ink tank 3 within retaining grooves 13 formed in collector 6 or storing ink within fibers using capillarity, and returning ink to ink tank 3, meaning that it provides the function of protecting the writing point from the influence of changes in pressure.

A collector type writing instrument has excellent performance such as capabilities of providing an ample amount of ink, securing the stable amount of ink flow down to the last drop and allowing for the amount of ink 2 left to be checked from the outside.

However, since the collector type writing instruments store ink 2 directly and allow movement of ink 2 to and from collector 6, there is a serious drawback that ink 2 will flood outside through air hole 10 of the writing instrument there being no space for withholding ink 2, there by polluting fingers or clothes if the writing instrument is exposed to an environment in which the ink inside collector 6 exceeds the maximum capacity of retention, which is the limitation of the internal pressure adjustment capacity. As the countermeasures for solving this problem or increasing the safety to some degree, it is possible to make collector 6 greater in capacity or make ink tank 3 smaller. There have already been writing instruments sold on the market which use a collector capable of preventing ink flood under usual environments, meaning gentle temperature changes and the like.

As the current situation is that collector type writing instruments use rather thick barrels, taking a safety margin into account, use of a thicker barrel than the present situation makes the instrument difficult to grip and loses the stylishness.

When ink tank 3 is made smaller, reduction of ink stored makes the life short. In contrast, when the normal collector 6 is made longer, the ink head H becomes higher because the ink head H acting on point assembly 1 is proportional to the height from the air/liquid exchanger 18 to the tip 9 of the writing assembly, hence forward leakage of ink 2 from tip 9 occurs.

On the other hand, when a writing instrument which has been capped under about 1 atm. on the ground and is uncapped inside an airplane in which the air pressure is generally reduced to about 0.8 atm., the interior of the pen which has been balanced under 1 atm., is instantaneously exposed to an environment of about 0.8 atm., so ink 2 inside moves in a rush and floods the space around the air channel of collector 6, whereby ink 2 floods out from air hole 10, being unable to be properly retained by the whole part of retaining grooves 13.

In order to solve the flooding problem occurring under conditions in which the air pressure varies, devices and inventions have been disclosed in Japanese Utility Model Publication Hei 3 No. 31580, Japanese Utility Model Publication Hei 3 No. 31581 and Japanese Patent Application Laid-open Hei 9 No. 104194, and others.

However, these disclosures only provide the function of blocking the flush to directly reach the air hole, hence a further effective improvement or other ways to reach a solution have been demanded.

There has been an invention which uses an air supply pipe and the like as disclosed in Japanese Patent Application Laid-open Hei 4 No. 227886. However, the conventional invention has the problem that the instrument cannot write continuously unless the writing element is turned down-side up for ink supply and also has the problem of ink capacity being only half filled up from the beginning. Therefore, it is necessary to add such usage instructions or explanation as to the initially reduced amount of ink, for the consumers.

Since it is considered that the instrument may be used in an environment in which sharp increase and reduction in air pressure repeatedly occur as in the situations where the instrument is carried over from one airplane to another or from low temperature outdoor air to the front of a heater, there have been demands for excellent free-state ink collector type writing instruments which do not need any usage explanation to consumers as above, adopt effective countermeasures against such repeated changes and still can provide beneficial writing comfort making use of low-viscosity ink 2.

As ink 2 is consumed during writing, collector type writing instruments are adapted to take external air into the ink tank 3 side through air/liquid exchanger 18 so as to avoid reduction in internal pressure. Therefore, it is usually necessary to provide a space in the rear of collector 6 for allowing free movement of air bubbles.

As conventionally disclosed in Japanese Utility Model Application Laid-open Sho 59 No. 184682 and other publications, in a configuration in which a solid article such as an ink absorber etc., is arranged in the ink tank, in contact with the rear of the collector, if air bubbles arising at the air/liquid exchanger do not pass through the ink absorber, which is wetted with ink, without resistance, the ink absorber itself will function as a second air/liquid exchanger. In this case, the internal pressure inside the writing instrument lowers, causing ink starvation and other writing deficiencies.

To solve the above problem, it is necessary to provide an arrangement which will not confine the rear of the collector or any other countermeasure. However, the air/liquid exchanger in the collector is usually provided at a single site, meaning that the position of the air/liquid exchanger should be well adjusted to that of the air bubble passage of the ink absorber when assembled.

When a small-diametric ink absorber is used to be built in so as to allow ink to move in and out around it, it is effective in preventing flooding. Since the ink absorber is somehow narrowed, it is necessary to make the ink absorber longer to make up for this thinning down. However, when ink held in a transparent ink tank runs out, the interior can be seen, so that, if the aforementioned part remains wetted with ink, it can be misapprehended as if there were still ink left. There occurs such an appearance problem.

Accordingly, there is a demand for solution to these problems.

Further, since collector type writing instruments have the problem that the life of writing abruptly ends when ink runs out, it is necessary to carry a spare if the writing instrument has a low amount of ink. There is a demand for collector type writing instruments which can provide an ample amount of ink, which is the feature of collector type writing instruments, until nearly the end of writing and can provide the performance of a fabric sliver type instrument, which delivers gradually reducing amounts of ink, for a short time at the end of its writing life so that the pen can be used to take some notes after the last drop of ink is used up. There are also other problems, including the problem of ink dropping from the writing point making it difficult to write when the pen has been kept upside down for long time, and the problem of ink leaking forwards due to deficiency of the inherent function of a collector type writing instrument because ink drops and the air/liquid exchanger dries when the pen is held with its tip up and the air/liquid exchanger cannot be wetted again with ink even when the pen is returned with its tip down if there is a part in the way that blocks ink. Even when an equal amount of ink is loaded, a collector type writing instrument delivers a greater amount of ink than a conventional fabric sliver type writing instrument and hence has a shorter life. Therefore, downsizing of the ink tank volume should be avoided as far as possible. There are demands for solution to these problems.

It is therefore a main object of the present invention to provide improvement of collector type writing instruments of prevalent models. In detail it is an object to provide a writing instrument which, without the necessity of a special configuration limiting the usage, can avoid crucial accidents such as pollution of consumer's clothes or fingers, due to forward leakage of ink 2 from tip 9 of point assembly 1 or flooding of ink 2 from air hole 10 exceeding the limit of the pressure adjustment capacity of collector 6, by absorbing the variation in pressure inside ink tank 3 resulting from change in temperature or air pressure.

There has been a demand for solution to the defect of collector type writing instruments, i.e., the liability to cause flooding especially when they are used on an airplane or under an environment in which sharp temperature change occurs. Therefore it is a first object of the present invention to provide an inexpensive collector type writing instrument with the above problem removed while the appearance and writing distance (life) are maintained as before.

Further, it is a second object of the present invention to provide a writing instrument which is able to secure flow channels that will not limit ink communication and passage of air bubbles when an ink absorber 31 and other parts are added as a means for solution of the above problem and which is free from the appearance problem of the amount of ink left being unable to be monitored because of the added parts, or which is configured so as not to receive any influence on the view of the amount of ink left.

It is also a third object of the present invention to prevent forward leakage by quickly wetting the air/liquid exchanger of writing instrument when it is used for writing in its downward position from a state where the air/liquid exchanger has been dried in its upward position.

It is possible to provide a further efficient writing instrument if the end of writing life problem and the ink drop problem can be solved.

DISCLOSURE OF INVENTION

In general, collector type writing instruments include ball-point pens, fountain pens, small-tube writing instruments and the like which have an ink feeder core (center core 8 and/or collector core 7) for assuring the flow path of ink 2 having a low viscosity (100 mPa.s or lower) from an ink tank 3 to a writing point 9 provided at the tip of a point assembly 1 or which have an ink feeder portion made up of a slit (in the case where a vertical groove 14 is extended to the tip) in a collector 6, 6a, and felt tip pens, markers and the like in which the ink feeder core (7, 8) itself serves as a writing tip 1. Hereinbelow, ink feeder cores (center core 8, collector core 7, etc.) will also include those which themselves serve as pen tips.

Arranged between ink tank 3 of a cup-like shape having a bottom integrally formed or assembled with a separate part such as a tail plug or the like and a point assembly is a collector 6, 6a, which may be formed of a plurality of retaining grooves 13 (generally, gaps defined by a plurality of vanes 12), an air groove 15 connected to the external air and a narrow longitudinal groove 14 creating communication between retaining grooves 13 or which may be made up of a fiber bundle, so as to retain ink 2 using capillary capacity. An air/liquid exchanger 18 of a small enough size is provided for collector 6, 6a and is adapted to be wetted with ink 2, so that ink tank 3 can be isolated from the external air and air will not enter ink tank 3 from the outside other than through air/liquid exchanger 18.

In the present invention, a collector writing instrument of an above-described general model is first provided with a snorkel 25, as an effective means of the present invention, which has a tubular vent portion 27, formed integrally or by assembly of parts, for releasing the air expanded in the rear part inside ink tank 3 to the collector 6, 6a side to thereby prevent application of pressure on ink 2. This arrangement functions as an effective means to prevent ink 2 from flooding when ink 2 has been consumed to some degree or the air inside ink tank 3 occupies the interior space to a certain degree in a state where point assembly 1 is placed downwards.

The snorkel 25 is also formed integrally or as a separate part, with a sectioning portion 26 for virtually separating ink tank 3, so that air can be easily ventilated through vent portion 27 of snorkel 25. An ink conduit 30 that is sized so as to be more unlikely to pass air than vent portion 27 does is formed as appropriate in sectioning portion 26.

In order for air bubbles, which are formed when air enters ink tank 3 through air/liquid exchanger 18 of collector 6, 6a from the outside during writing, to be able to move to the rear space without receiving significant friction from ink absorber 31 and snorkel 25 etc., a clearance portion 42 is preferably provided between the collector 6, 6a and snorkel 25. The clearance portion 42 also functions as an air channel for relieving the relatively high internal pressure in ink tank 3 of the writing instrument when the ambient environment of the writing instrument is relatively low in pressure.

The first effective means of the present invention is configured so that snorkel 25 is equivalent in wettability to collector 6, 6a. As the specific means, snorkel 25 is molded of the same material as the collector is, or is subjected to the same wettability reforming treatment as collector 6, 6a is, so that the snorkel is equivalent in wettability to collector 6, 6a. Usually, collector 6, 6a is molded of a material having resistance to ink such as ABS, AS, PS, PP, PET, or these resins kneaded with additives such as surfactants and the like. More generally, the collector may be subjected to a hydrophilic treatment utilizing a plasma treatment or achemical treatment with a mixture of sulfuric acid and chromic acid, aiming at improvement of ink wettability of surfaces. These techniques have been conventionally done. Since snorkel 25 of the present invention can also be improved in wettability to ink 2 by using a similar material or surface reforming treatment, air bubbles can readily move during writing hence the writing performance is unaffected while ink 2 spreads over the surfaces of the parts inside ink tank 3 in an extremely thin manner, whereby improvement against the appearance problem when no ink is left can be expected.

The second effective means of the present invention is configured so that snorkel 25 is equivalent in wettability to ink tank 3. As the specific means, snorkel 25 is molded of the same material as ink tank 3 is, or is subjected to the same wettability reforming treatment as ink tank 3 is, so that the snorkel is equivalent in wettability to ink tank 3. Usually, ink tank 3 is molded of a material having resistance to ink such as AS, PS, PP, PET, or these resins kneaded with additives such as Teflon particles and the like, aiming at lowering surface wettability so as to repel ink. Conventionally, oil-based ball-point pen tubes and the like have been molded of PP resin which is less wettable or have been subjected to a water-repellent treatment such as silicone oil coating or Teflon coating. Since snorkel 25 of the present invention can also be lowered in wettability to ink 2 by using a similar material or surface reforming treatment, air bubbles can readily move into vent portion 27 during writing hence the writing performance is unaffected while ink 2 is repelled by the parts inside ink tank 3, whereby improvement against the appearance problem when no ink is left can be expected.

As the third effective means of the present invention, an ink absorber 31 made up of a fabric sliver, sponge, fiber bundle, foamed material, or the like capable of retaining ink is incorporated in ink tank 3 and connected to center core 8, collector core 7 or longitudinal groove 14 for leading ink 2 from ink tank 3 to point assembly 1.

Ink absorber 31 is arranged so as to at least reach a position more rearward than the approximate center of ink tank 3 and so as to be able to absorb ink 2 through front and rear openings thereof.

As ink absorber 31, a fiber bundle core which is formed by bonding or forming ordinary fibers with adhesives or with heat, a fabric sliver made up of soft fibers or a continuous-foamed sponge, covered by an unabsorbent cladding can be used. In order to use ink 2 efficiently, necessary methods such as reducing the capillary capacity lower than that of center core 8 and collector core 7 may be preferably employed as appropriate.

As the fourth effective means of the present invention, a cladding 35 of ink absorber 31 is configured so as to be equivalent in wettability to ink tank 3 or snorkel 25. As the specific means, cladding 35 is molded of the same material as snorkel 25 or ink tank 3 or is subjected to the wettability reforming treatment as described above so that the cladding is equivalent in wettability to snorkel 25 or ink tank 3. This configuration eliminates the appearance problem relating to ink wettability.

BEST MODE FOR CARRYING OUT THE INVENTION

Now, the illustrated embodiment will be detailed. The same components as those described above are allotted with the same reference numerals without description.

Figure 1:
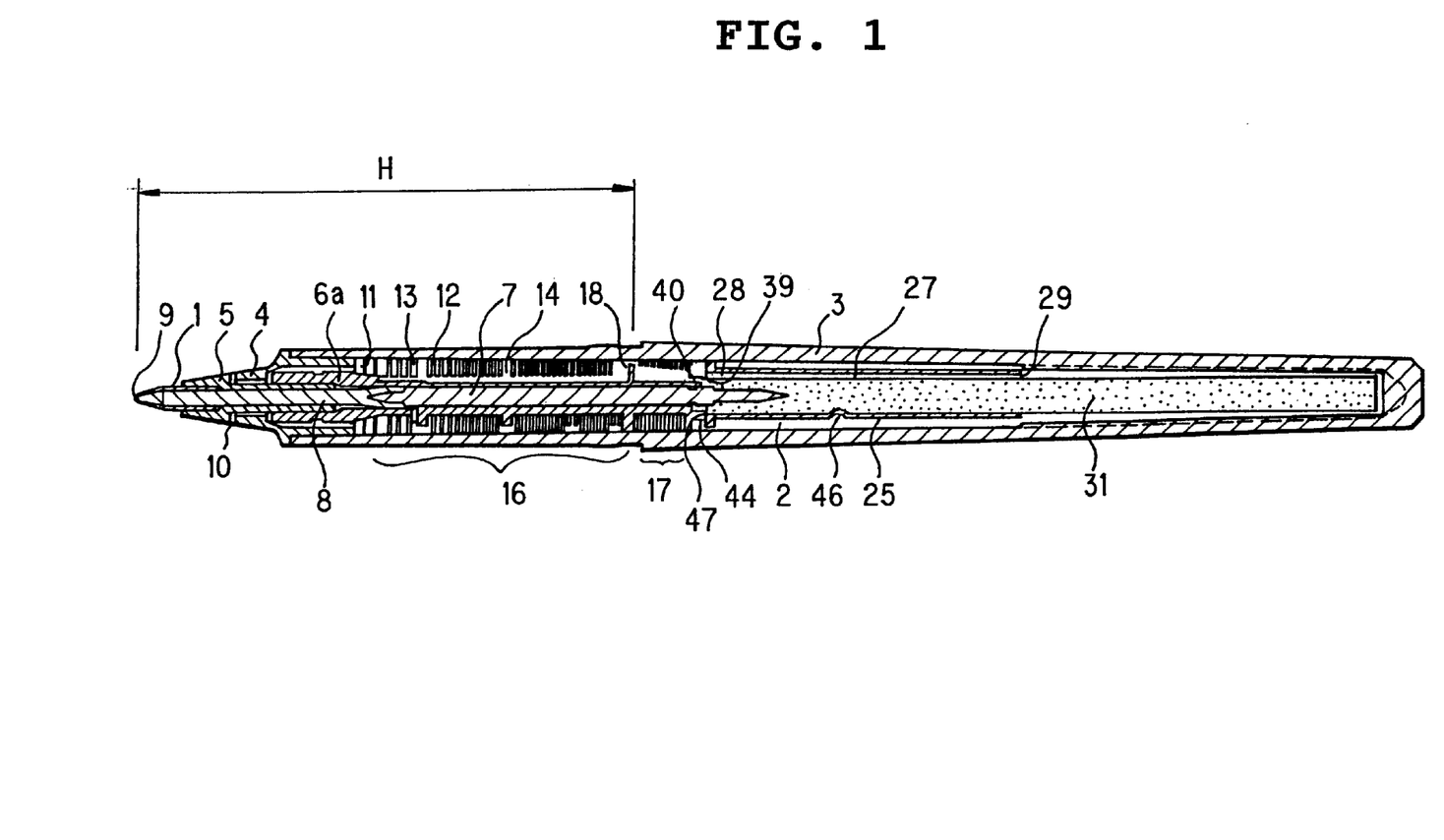
FIG. 1 is a vertical sectional view showing the whole writing instrument of the first embodiment of the present invention.

As shown in FIG. 1, the writing instrument of the first embodiment of the present invention is a ball-point pen comprised of a point assembly 1 having a ball as a writing point 9 at the tip and an ink feeder portion made up of a center core 8 and a collector core 7 serving as an ink feeder core for establishing the flow passage of ink 2 from an ink tank 3 to writing point 9.

As point assembly 1, pen tips 1 of various types of writing instruments such as felt tip pens, fountain pens, small-tube writing instruments and the like can be used as already mentioned. A collector 6a, which is composed of vanes 12 defining retaining grooves 13 therebetween and a narrow longitudinal groove 14 for establishing ink communication between an air groove 15 connected to the outside and each retaining groove 13, is arranged between ink tank 3 of a cup-like shape having a bottom integrally formed or assembled with a separate part such as a tail plug or the like and point assembly 1, forming a so-called collector type writing instrument.

The collector 6a may be the conventionally used retaining vanes 12 arranged crosswise, or may be one that uses a fabric sliver etc. In any way, the collector is a part which has the function of adjusting the variations in pressure by temporarily storing ink with the help of capillary balance and the function of relatively reducing the pressure inside ink tank 6a by making use of a small-diametric meniscus mechanism at an air/liquid exchanger 18 so as to avoid extra ink head applying to the interior of point assembly 1.

In the collector writing instrument, free-state ink 2 is stored inside ink tank 3 while air/liquid exchanger 18, which is provided in collector 6a and is small enough, is wetted with ink 2, so that ink tank 3 is isolated from the external air and air will not enter ink tank 3 from the outside other than air/liquid exchanger 18.

Generally, collector 6a may be subjected to a plasma treatment, a chemical treatment with a mixture of sulfuric acid and chromic acid or a surface coating treatment, or the molding resin may be added and kneaded with a saponaceous component which is well wettable to improve the wettability so that the collector is ready to be wetted with ink 2. Other components such as a plastic mouthpiece 5, joint 4, cap (not shown), ink 2 and the like should not be limited particularly by the present invention, and conventional items can be selected and used as appropriate. Similarly, for ink 2, any ink can be used and selected as appropriate as long as it can be used for collector type writing instruments. Examples include: inks based on water, alcohols, xylene, various glycolic solvents, various etheric solvents and other solvents, inks containing pigments, dyes as coloring agents and inks having some viscosity or pseudo-plasticity.

A collector type writing instrument has a function of preventing leakage of free-state ink from the interior by keeping the balance with the variation in pressure. When the internal pressure inside ink tank 3 varies, ink 2 may enter retaining grooves 13 of collector 6a by way of air/liquid exchanger 18 or air may enter tank 3 by way of air/liquid exchanger 18 so as to keep the balance of the internal pressure, whereby almost no pressure other than the ink head H acts on the interior of point assembly 1 while the meniscus at air/liquid exchanger 18 functions to practically keep the pressure in the ink tank 3 side lower than the external pressure to prevent forward leakage from point assembly 1.

Though it is possible to lower the internal pressure and hence easily prevent ink leakage by making the diameter of air/liquid exchanger 18 smaller, ink flow for writing is also hindered at the same time. Therefore, the size of air/liquid exchanger 18 is typically set at about 0.05 mm to 0.2 mm.

Air/liquid exchanger 18 is provided in a groove form, or when the center core and collector core as fiber bundle cores are made up of fabric sliver, gaps between fibers serve as air/liquid exchanger 18.

In general, when the amount of ink 2 in ink tank 3 is reduced by ink consumption for writing to a level slightly greater than the maximum retention of the collector, expansion of air in ink tank 3 becomes maximum. Therefore, the conventional collector type writing instruments are designed so as not to cause flooding of ink 2 from air hole 10 by filling collector 6 with ink 2 in case air expansion or contraction inside tank 3 occurs due to increase or decrease in external air pressure or change in temperature. Generally, a correlation between the volume of an ink tank 3 and the maximum ink retention amount i of a collector has been known. Conventionally, the writing instrument is usually designed so that the maximum ink retention volume is about 10 to 30% of the ink tank volume.

Generally, it is possible to improve safety margin as to flooding if the proportion of the maximum ink retention volume to the size of ink tank 3 is increased. However, if collector 6 is made too long, the ink head H acting on the point assembly 1 becomes too high, posing the forward leakage problem from the point assembly.

If collector 6 is made too large in diameter, the barrel size becomes too thick, causing difficulties in gripping and influence on its external appearance or stylishness.

If ink tank 3 is made smaller, the amount of ink decreases, resulting in short writing distance.

For these reasons, in the embodiment of the present invention, extra auxiliary retaining grooves 17 are formed in addition to main retaining grooves 16 as shown in FIG. 1 so as to increase the retaining volume of the collector without increase of ink head H.

Figure 2:
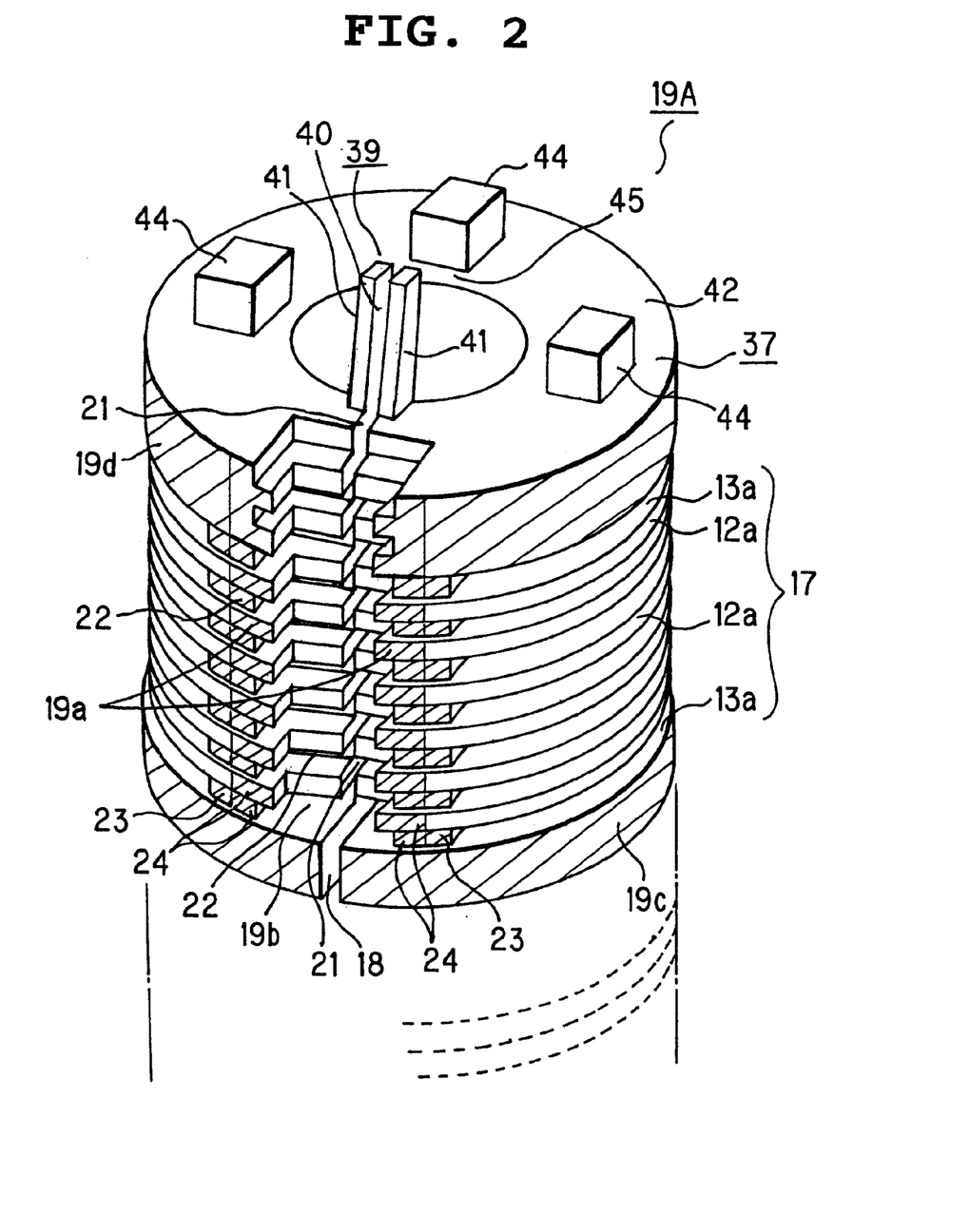
FIG. 2 is a perspective view showing a partitioning portion 19A of a collector 6a of a writing instrument of the first embodiment of the present invention.

FIG. 2 is a perspective view showing auxiliary retaining grooves 17 (partitioning portion 19).

Auxiliary retaining grooves 17 is formed in partitioning portion 19A in order to increase the ink retention.

Partitioning portion 19A is constructed of a frontmost partitioning portion 19c formed with air/liquid exchanger 18, a rearmost partitioning portion 19d confronting ink tank 3 and extended partitioning portions 19a for connection between the frontmost partitioning portion 19c and rearmost partitioning portion 19d. The part with hatching shown in FIG. 2 is wetted with ink 2 and hence shut off from external air. Exchange of air with the ink tank is made through air/liquid exchanger 18.

A number of fin-like vanes 12a protruding upright like flanges are formed at predetermined intervals on the outer peripheral surface in the range of auxiliary retaining grooves 17 and define retaining grooves 13a by the gaps therebetween. In the present embodiment, six vanes 12a are provided at regular intervals, constituting auxiliary retaining grooves 17.

Partitioning portion 19A and air/liquid exchanger 18 (groove or hole) is wetted with ink 2 so that the interior of ink tank 3 is substantially shut off from external air. For air replacement during writing, air/liquid exchanger 18 alone serves for air replacement.

Partitioning portion 19A may be formed by a part or combination of parts having no intentional grooves or holes. Alternatively, the partitioning portion may be formed with a part or parts having fine grooves or holes, as long as their dimensions are small enough compared to the dimensions of air/liquid exchanger 18, so that once the parts have got wetted with ink 2 no air replacement will be permitted therethrough or substantial confinement can be assumed to be established.

Formed in the space enclosed by extended partitioning portions 19a, rearmost partitioning portion 19d and frontmost partitioning portion 19c is an enclosed portion 19b which constitutes a channel that permits air bubbles entering by air replacement to move from air/liquid exchanger 18 to the ink tank side 3 side.

Enclosed portion 19b is formed of a relatively wide groove, cutout or hole for permitting air bubbles arising from air replacement to move to the ink tank 3 side, and preferably has a configuration which is usually filled up with ink 2 when the writing instrument is put with its pen tip down. The enclosed portion 19b of the present embodiment is configured so as to form a space which gradually increases its depth in the radial direction of collector 6a as it approaches from the air/liquid exchanger 18 side to the ink tank 3 side. This arrangement of enclosed portion 19b formed so that the areas of opening become gradually greater from the air/liquid exchanger 18 side to the ink tank 3 side, enables air bubbles arising at air/liquid exchanger 18 to move to the ink tank 3 side more smoothly compared to the configuration where the areas of opening are made uniform.

Further, enclosed portion 19b is formed with lateral grooves 22 and a narrow slit 21 which leads ink 2 towards air/liquid exchanger 18.

Since narrow slit 21 provides almost the same functions, i.e., introduction and connection of ink 2, as narrow longitudinal groove 14 connected to main retaining grooves 16 does, it can be formed with dimensions and configuration similar to those of longitudinal groove 14, but may be formed by a cutout or hole defined by combination of parts as long as it can provide the function of leading ink 2 to lateral grooves 22.

Further, in order to lead ink 2 from lateral grooves 22 into retaining grooves 13a, partition portion grooves 23 having almost the same width as retaining groove 13a are formed on the outer peripheral surface of extended partitioning portions 19a.

In order to lead ink 2 from narrow slit 21 to partitioning portion grooves 23, lateral grooves 22 for connection between narrow slit 21 and partitioning portion grooves 23 are formed in enclosed portion 19b.

Lateral groove 22 may be formed by a groove, cutout, hole, clearance defined by a plurality of parts, or any other structure and shape, which provides the function of creating communication of ink 2 led from the ink tank 3 side via narrow slit 21 to auxiliary retaining grooves 17, as long as it can practically lead ink 2 to auxiliary retaining grooves 17.

Further, in the present embodiment, in order to make ink flow smoothly from the enclosed portion 19b side to the auxiliary retaining grooves 17 side, the edges of extended partitioning portions 19a are cut off so as to form chamfers 24.

Chamfers 24 are formed so that the size of the opening becomes smaller as it goes from the enclosed portion 19b side to the auxiliary retaining grooves 17 side.

In the present embodiment, the ink head H is the difference in height from air/liquid exchanger 18 to writing point 9 of point assembly 1. That is, the ink head is the same as conventional collector type writing instruments, hence no forward leakage, or ink leakage from writing point 9 will occur.

The capacity of adjustment when the air space inside ink tank 3 expands or contracts, namely the maximum ink retention amount i of collector 6a is increased by the maximum ink retention amount ie of the auxiliary retaining grooves compared to the conventional collector 6. Therefore, the resultant collector type writing instrument is improved in its capability to deal with variation in pressure and change in temperature.

The ink lead and discharge arrangement, aiming at establishing communication between auxiliary retaining grooves 17 of the present invention and ink 2 inside ink tank 3, constituted by narrow slit 21, lateral grooves 22, partitioning portion grooves 23 and the like, enables ink 2 in ink tank 3 to flow into auxiliary retaining grooves 17 and main retaining grooves 16 of collector 6a, simultaneously if a sharp variation in pressure occurs. In sum, unlike the conventional configuration in which all ink 2 would flow in a rush and flood out by way of only air exchanger 18, ink may also flow into auxiliary retaining grooves 17, thus making it possible to alleviate the rushing flow.

Further, the arrangement of auxiliary retaining grooves 17, lateral grooves 22, partitioning portion grooves 23 and narrow slit 21 assures that ink 2 will flow into auxiliary retaining grooves 17 when a sharp reduction in external air pressure occurs as stated above, whereby it is possible to reduce the amount of ink flowing into main retaining grooves 16 as well as weakening the power of the rushing flow.

Moreover, when a sharp increase in external air pressure occurs, the ink 2 held in auxiliary retaining grooves 17 can return to ink tank 3 owing to the arrangement of auxiliary retaining grooves 17, lateral grooves 22, partitioning portion grooves 23 and narrow slit 21, in an easier manner than ink returns through air/liquid exchanger 18. Therefore, even if increase and decrease in pressure is further repeated, the ink retention volume of collector 6a capable of retaining ink 2 can be easily recovered so that it is possible to increase the permissible margin against flooding.

Since partitioning portion 19A has a rather irregular configuration, there are cases where the collector end face may dry when the device is assembled or when it has been set with its tip up for a long period. In such a case, it happens that this part becomes difficult to be wetted with ink 2 immediately. In order to reliably wet this part with ink 2 and practically shut of f ink tank 3 from external air, narrow slit 21 for leading ink and lateral grooves 22 and partitioning portion grooves 23 connected to the slit to enable ink to reach auxiliary retaining grooves 17 are provided, whereby the entire partitioning portion 19A gets wetted with ink 2 once narrow slit 21 gets wetted with ink 2.

Further, a lead portion 39 is formed and integrally with collector 6a in rearmost partitioning portion 19d while horned projections 41 defining a lead channel 40 contiguous to narrow slit 21 are formed so as to be inserted into the front end part of ink absorber 31.

Provision of projections 41 makes it possible for ink 2 in ink absorber 31 to flow into air/liquid exchanger 18 of collector 6a even if point assembly 1 is set downward when free-state ink 2 inside ink tank 3 is used up and when ink 2 is stored virtually to fully 100% in ink absorber 31. As a result, a meniscus can be formed at air/liquid exchanger 18, whereby it is possible to prevent forward leakage because the ink head acting on point assembly 1 can be equalized to the ink head H acting when free-state ink 2 is stored.

Further, a spacer portion 44 is formed in rearmost partitioning portion 19d. This creates a clearance portion 42, whereby air bubbles from air/liquid exchanger 18 can smoothly pass through vent portion 27 of snorkel 25 to reach the rear part of ink tank 3.

The spacer portion 44 is formed at limited sites on the rear end of collector 6 with an air bubble passage channel 45 (FIGS. 2 and 3) formed so as to assure clearance portion 42 (FIGS. 2 and 3) that permits air bubbles to move.

Further, spacer portion 44 has an abutment 47 (FIG. 3) on which the front of ink absorber 31 is abutted, whereby ink absorber 31 can be prevented from moving toward the collector 6a side.

Figure 3:
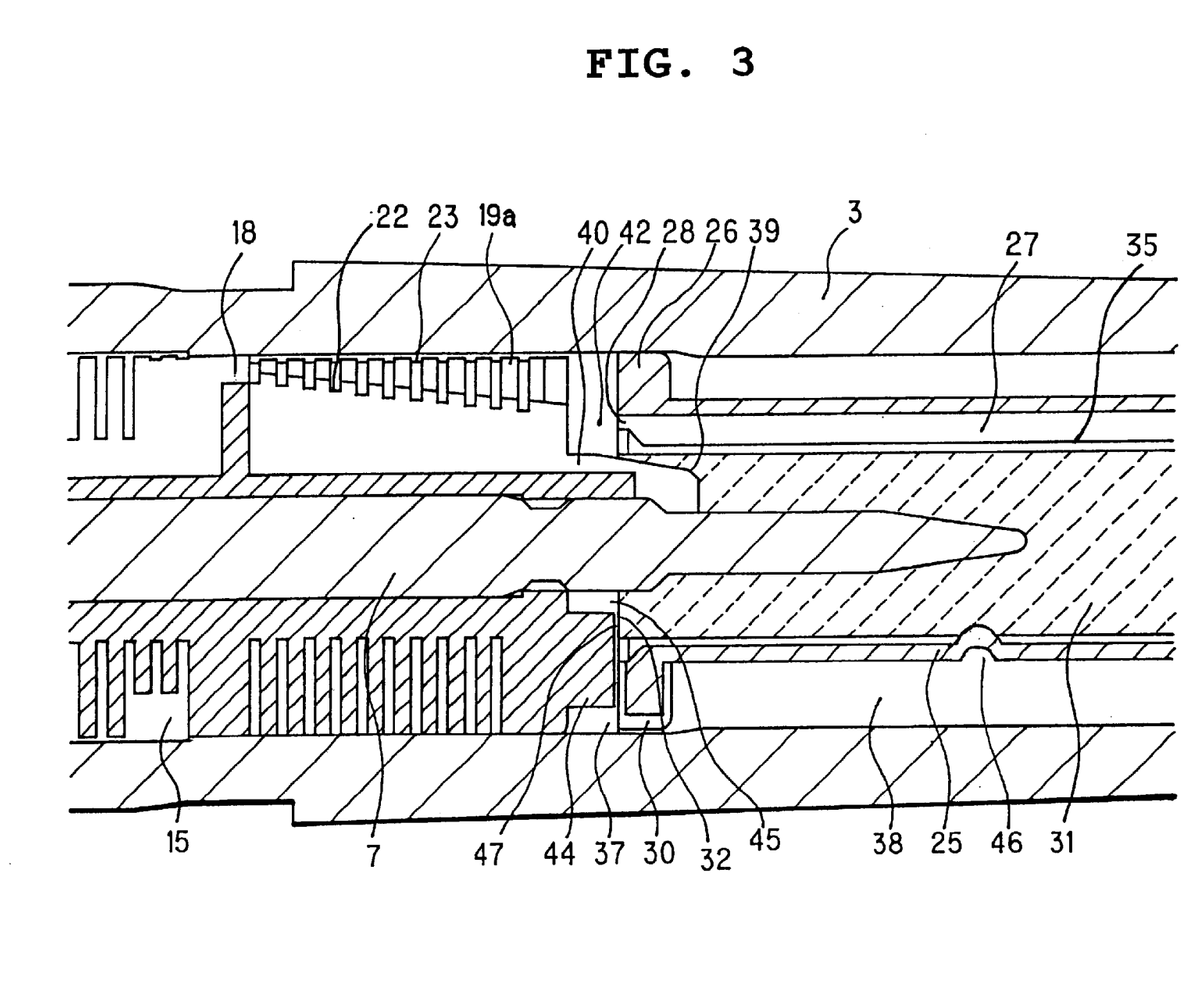
FIG. 3 is an enlarged vertical sectional view showing the rear part of a writing instrument of the first embodiment of the present invention.
Figure 4:
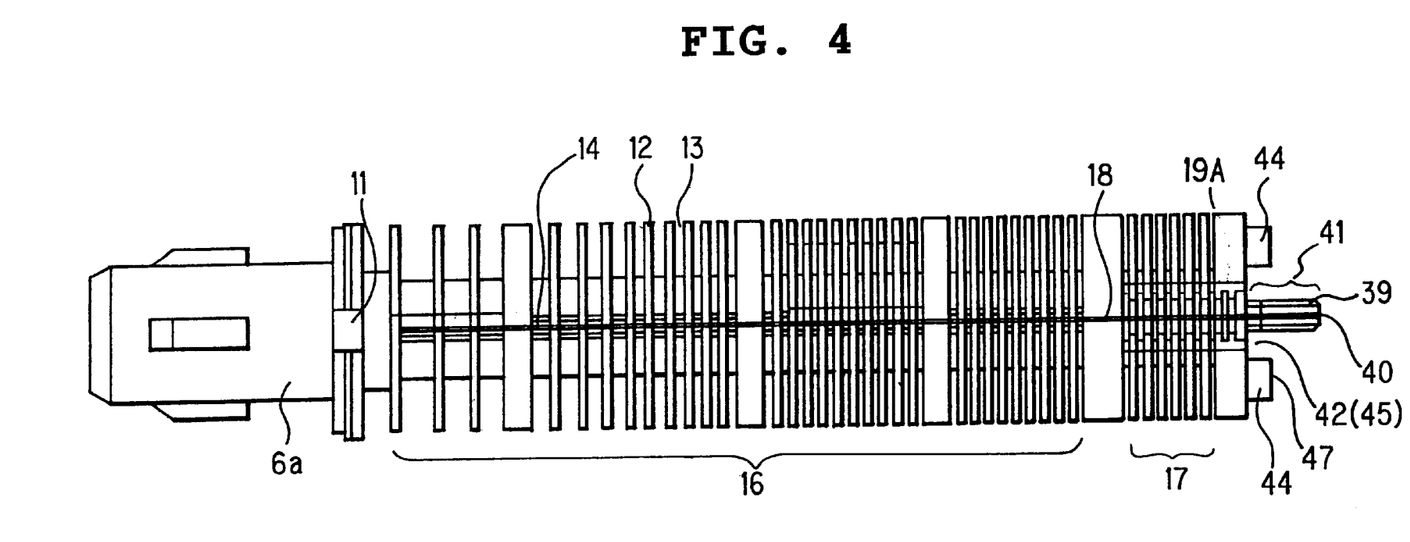
FIG. 4 is a plan view showing the appearance of a collector 6a of the first embodiment of the present invention.

Spacer portion 44 should have a size just large enough to allow air bubbles to pass, but if it is too large, the length of ink absorber 31 becomes short, ink 2 becomes unlikely to flow into the front tank 37 side during writing, and other light problems may occur. If it is too small in size, air bubbles cannot pass therethrough. Air/liquid exchanger 18 of a typical collector type writing instrument has a vertical slit-like groove having a width ranging from about 0.05 mm to 0.25 mm, and air bubbles arising therefrom are greater than the size of air/liquid exchanger 18 but are at most about 1.5 mm in diameter and usually about 1 mm. Accordingly, the size of clearance portion 42 is preferably set at about 1 mm to 3 mm.

Conventionally, if a collector type writing instrument is used while travelling by air, on the ground under about 1 atm. and in an airplane during flight in which the air pressure is assumed to be about 0.8 atm., repeatedly, ink moves in a rush into collector 6 and may flood out, being unable to be properly retained, or if the outside air pressure abruptly increases, only air may enter tank 3 while ink 2 in collector 6 will not return to tank 3. In particular, after repetition of such cycles, ink 2 gradually accumulates and fills retaining grooves 13 of collector 6, causing flooding. Or even if the writing instrument does not cause any flooding as is, it may cause flooding due to a slight temperature rise such as of body temperature. A solution to this drawback has been demanded.

As an effective configuration in the first embodiment of the present invention, first a sectioning portion 26 for virtually separating ink tank 3 is provided. Further, a snorkel 25 is provided in order to suppress ink 2 from flowing out from tank 3 to as little as possible by releasing air when air in ink tank 3 expands with point assembly 1 set downwards.

Snorkel 25 is composed of a sectioning portion 26 for separating ink tank 3 and a vent portion 27 forming a tubular air path so as to establish air communication between a front opening 28 (FIGS. 1 and 3) arranged at the rear end side of collector 6a and a rear opening 29 (FIG. 1) arranged at the approximate center of, or at a position more rearward than, ink tank 3.

Sectioning portion 26 is press fitted against the inner wall of ink tank 3 so as to practically separate it into a front tank 37 and rear tank 38.

Sectioning portion 26 is formed with a single ink conduit 30 (preferably a number of conduits smaller in size than the vent portion 27) which is formed of a groove or hole sufficiently small compared to the size of vent portion 27. Ink conduit 30 may be formed on the inner wall side of ink tank 3 or on both the sectioning portion 26 side and the inner wall side of ink tank 3. Also, ink conduits 30 may be formed at a plurality of sites.

This provision of snorkel 25 makes it possible, when the device with a reduced amount of ink is set with its point assembly 1 down, ink 2 in ink tank 3 is able to move from the rear tank 38 side divided by sectioning portion 26 to the front tank 37 side by way of ink conduit 30. That is, tank 3 is separated by sectioning portion 26, however, these sections are actually not isolated from each other because of the presence of ink conduit 30. Therefore, this arrangement permits continuous writing as well as allowing ink 2 to move into the collector 6 side. It was confirmed from a prototype test that ink 2 could move to the front tank 27 side during writing. Thus, when the air pressure and temperature change in a moderate manner, provision of collector 6a and the like enables collector 6a to exhibit sufficient ink retaining capability, in the same manner as before.

For use in an airplane or when the device is carried between low temperature and high temperature environments, the pen is sealed with the cap in order to prevent evaporation of ink 2 inside. Taking an example of use in an airplane, the pen is usually used on the ground under a pressure of about 1 atm. and is capped in a state where the pressure inside ink tank 3 has been stabilized in correspondence with the 1 atm. environment, so that the internal pressure is maintained at that level. After the user boards an airplane, the user first opens the cap and uses the writing instrument under a reduced pressure, at about 0.8 atm. At this moment, the internal pressure of the writing instrument, which has been stabilized at approximately the 1 atm. state, is abruptly exposed to a 0.8 atm. Therefore, since the internal pressure in ink tank 3 is relatively higher than the pressure inside an airplane, in the case of a collector typewriting instrument, ink 2 floods in rush into collector 6 via air/liquid exchanger channel 18.

In the arrangement of the present invention equipped with snorkel 25, the air inside tank 3 in which the internal pressure is relatively high can be released preferentially to the collector 6a side by means of vent portion 27. Ink 2 around the front tank 37 also flows in at the same time, but the amount is sufficiently small so that it is possible to prevent flooding.

Because, in a usual usage of a collector type writing instrument, the same amount of air as that of ink 2 flowing out for writing will enter the ink tank 3 side, as air bubbles, through air/liquid exchanger 18, and because when capped the writing instrument is held in a pocket with its tip up or kept laterally in a bag, front tank 37 is, in most cases, empty, without ink. Thus, the writing instrument is constructed so that almost no ink 2 flows into the collector 6a side or ink is unlikely to flood when a sharp increase or reduction in pressure occurs.

If an abrupt movement of ink 2 or air inside the writing instrument occurs, ink 2 is blocked by sectioning portion 26 so that ink cannot directly reach collector 6a. When there is a large enough difference in resistance against flow between vent portion 27 and ink conduit 30 which is smaller in size than the vent portion 27, the more abrupt the flow of ink 2 or air occurs, the fluid flow is greater in the direction in which it is most liable to flow. When flow of ink or air through a passage of an identical size is considered, air can flow much more easily through the passage. That is, when an abrupt change occurs air can flow through vent portion 27 that opens to the space. In this case, air receives much less passage resistance compared to the passage resistance against ink 2 that flows through ink conduit 30 when the writing instrument is set downward and hence the conduit is wetted with ink 2. As a result, mostly only air will flow to the collector 6a side when a sharp increase or decrease in pressure occurs.

Since writing instruments are usually kept for a long time with their point assembly 1 up after they are capped, there is a high possibility that air space occupies around collector 6a when a reduced amount of ink is held. When the pen is oriented downwards for writing, it is possible for ink 2 to take a long time to flow out and wet parts up to air/liquid exchanger 18 as already mentioned. However, there happen cases where ink 2 cannot easily flow into the collector 6a side (taking some minutes at the maximum) because of presence of sectioning portion 26. In this case, since air/liquid exchanger 18 is not wetted with ink 2, it happens that it is impossible to obtain the proper function of a collector writing instrument i.e., the preventing function of forward leakage from the point assembly by creating a reduced pressure state in ink tank 6a compared to external air, by a meniscus that should be formed when air/liquid exchanger 18 of collector 6a is wetted with ink 2. To reach a solution of the forward leakage problem from such a situation, in the present invention, snorkel 25 is formed of an easily wettable material or is subjected to a wettability reforming treatment in the same manner as collector 6a, so that the flow of ink 2 from the ink tank 3 side up to air/liquid exchanger 18 when the writing instrument is oriented downwards can be assured. Specifically, in the first embodiment, snorkel 25 is reformed as to wettability by a plasma process. This process not only makes it possible for ink to become able to spread and wet the surface of snorkel 25 incorporated in ink tank 3 and hence readily wet air/liquid exchanger 18, but also makes it possible for air bubbles arising from air replacement during writing to move smoothly without causing any bad effect on the writing performance.

Further, since, in the configuration of the present invention, parts are immersed in ink 2 and incorporated in ink tank 3, there is a risk of deficiency in that the device bears an appearance as if there were ink 2 left when these parts remain wetted with ink 2. It was found that formation of snorkel 25 with an ink-wettable material or processing it through a wettability reforming process is effective in solving this appearance problem, too. In sum, since the part surfaces are formed to readily get wetted, ink 2 can be efficiently flow toward the rear end of collector 6a, center core 8, collector core 7 etc., for writing even when ink 2 is almost used up. As a result, the amount of ink adhering to the part surfaces lowers, and adhering ink 2 spreads over the part surfaces in an extremely thin manner so that the original color of the parts can be seen with less color of ink 2, meaning that there occurs no misapprehension that there is still ink left.

As the second feature of this embodiment, an absorber 31 capable of retaining ink is disposed together with the above-described snorkel 25. The inventor hereof has found that provision of ink absorber 31 inside ink tank 3 has the effect on reducing the volume of the space (to be referred to hereinbelow as 'volume reduction effect') without reducing the amount of ink 2 when the space grows in ink tank 3 as ink 2 is consumed.

Ink tank 3 is usually molded of a transparent resin such as PP, PE, PET, PS, AS and others, taking into account the visibility of the amount of ink left, prevention of ink against evaporation and other factors. It should be noted that, if the ink tank 3 surface is easy to get wetted with ink 2, there occur cases where the visibility of the amount of ink left in the tank becomes bad if ink 2 is left therein. If an ink tank is formed of PP, PE and the like which have a low critical surface tension hence a bad wettability, the surface will repel ink 2 hence providing a good visibility. On the other hand, since PS, AS and the like are easy to get wetted with ink, they are used to be subjected to a silicone oil treatment or a Teflon coating treatment, or these materials added with water-repellent additives are kneaded to form an ink tank molding. By applying the above knowledge, snorkel 25 or a cladding 35 of ink absorber 31 was subjected to a water-repellent treatment or was molded from PP and the like and the resultant parts were tested. As a result, it was found that ink 2 was repelled forming drops of ink, which flowed to the rear end of collector 6a, etc., hence no misapprehension of the appearance that ink is left would occur. Thus, when it is possible to secure a means such as a channel, groove, etc., which allows ink 2 to fall toward the collector 6a side, execution of a water-repellent (ink-repellent) treatment is also effective.

As above, in the present invention, the amount of expansion of the space itself occurring upon a sharp change in pressure is reduced so as to weaken the power of flooding, whereby it is possible to reduce the amount of ink flowing to the collector 6a side. As a practical arrangement, ink absorber 31 made up of fabric sliver or the like is arranged so as not to block vent portion 27 of snorkel 25. In order to make the volume reduction effect of ink absorber 31 effective, the ink absorber should have a length which reaches to the approximate center of ink tank 3 or extended to further rear. When ink absorber 31 is storing ink 2, the absorber occupies the rear space without reducing the loaded amount of ink, whereby it is possible to substantially reduce the expansion of air when an increase or reduction in pressure occurs.

Further, in order to take advantage of one of the benefits of free-state ink type writing instruments, that is, the feature that the amount of ink left in ink tank 3 can be viewed from the outside, it is necessary for ink 3 to freely enter or leave at least a sector formed around ink absorber 31. For this reason, the outside diameter of ink absorber 31 is designed to be sufficiently smaller than the inside diameter of ink tank 3.

(Operation)

The operation of the present invention will be described in the embodiment.

The arrangement of the present invention not only provides the same function of conventional collector type writing instruments, i.e., prevention against ink flooding when the internal pressure varies in a relatively gentle manner with change in temperature, but also provides the function of preventing ink from abruptly entering the collector from the ink tank side, by releasing air from the tank when an abrupt change in pressure occurs, in consideration of use on an airplane.

Further, since air is released, the power of ink flushing can be weakened if ink flows out and it is also possible to solve the problem of ink accumulating within the collector due to use under conditions in which increase and reduction in pressure is repeated. Thus, this configuration is able to totally prevent accidents of collector type writing instruments, including flooding and forward leakage.

The arrangement in combination with the ink absorber provides a combined enhanced effect of the function of the invention for releasing expanded air to the outside of the writing instrument as much as possible and the volume reduction effect of the ink absorber, whereby it is possible to provide a writing instrument with which the problem of flooding will almost never occur.

Further, because of provision of the ink absorber, the ink drop problem which would occur when the writing point have been kept upward can be resolved. Because of presence of ink absorber 31, the writing instrument can deliver ink, though in a reduced amount, for approximately the last 100 meters of the writing life. Therefore, it is possible to solve the end of writing life problem with free-state ink typewriting instruments or avoid the writing instrument abruptly stopping writing.

The arrangement of the present invention makes it possible to constantly secure the gap through which air bubbles can smoothly flow from air/liquid exchanger 18, so that the excellent writing performance belong to collector type writing instruments will never be spoiled. When the arrangement is adapted so that ink 2 will readily flow over the part surfaces, it is possible to stabilize the forward leakage preventing function owing to a meniscus in a collector type configuration and its writing performance, by constantly wetting air/liquid exchanger 18.

Since use of materials or surface-reformed parts of the present invention is able to change the wettability to ink 2, it is possible to prevent occurrence of misapprehension that ink 2 is left in ink tank 3 despite that there is no ink 2 left. Because of the functions as above, this configuration is free from problems, and makes adjustment against sharp change in internal pressure so as to provide the function of eliminating the occurrence of flooding and forward leakage in any possible usage situation of writing instruments and hence provides a writing instrument having excellent writing comfort and good appearance.

As the configuration and functions of the writing instrument of the present invention have been described heretofore, it is possible to provide a writing instrument which is slim and stylish and excellent in writing performance.

It is possible to suppress writing anomalies and forward leakage from the pen tip due to usage under varying pressure in an airplane, usage in an environment with change in temperature, pumping phenomena resulting from capping, being dropped or other reasons and hence secure safe and stable writing performance. In particular, it is possible to provide a writing instrument free from flooding and forward leakage problems which would have occurred under conditions in which increase and reduction in pressure is repeated, such as in an airplane, as experienced by a businessperson who writes while traveling and who takes multiple flights.

Further, by the combination with the ink absorber, it is not only possible to improve the safety margin but also solve the ink drop problem and the end of writing life problem at the same time. Thus, this configuration has effective functions as described heretofore compared to conventional collector type writing instruments and hence contributes to providing a safe collector writing instrument which is stylish and low in cost, can be easily manufactured, has a long shelf life and provides easy view of the amount of ink left at its end of writing life, without having any deficiencies of the parts for satisfying the use in an airplane.

In the above description of the embodiment, collector 6a equipped with auxiliary retaining grooves 17 has been explained as the best mode. However, it is possible to provide the functions and effects by using a collector 6 which has no auxiliary retaining grooves 17 of the present invention.

INDUSTRIAL APPLICABILITY

The present invention can be applied to collector writing instruments which can be used under a varying pressure environment in an airplane or under an environment in which temperature changes. In particular, the present invention can be applied to writing instruments which are used under conditions in which increase and reduction in pressure is repeated, such as in an airplane, as experienced by a businessperson who writes while traveling and who takes multiple flights.

What is claimed is:

1. A collector type writing instrument including: a point assembly with a writing point at a tip thereof, an ink tank for storing a low viscosity ink in a free-state ink condition, an ink feeder portion extended from the ink tank to the point assembly, and a collector disposed between the ink tank and the point assembly as an adjuster element for storing ink within a plurality of grooves when an inner pressure is adjusted, the writing instrument characterized in that:

the ink tank is formed therein with a snorkel having, integrally or as a separate part, a sectioning portion for substantially separating the ink tank without an ink conduit into a front tank and a rear tank, and a vent portion for establishing air communication between the front and rear spaces divided by the sectioning portion, the ink conduit is sized so as to be more unlikely to pass air than the vent portion does, and is formed in the sectioning portion, an inner wall of the ink tank, or both of the sectioning portion and the inner wall of the ink tank, the vent portion of the snorkel allows an air bubble to pass through, and has a front opening arranged at a rear end side of the collector and a rear opening arranged at a approximate center of, or at a position more rearward than, the ink tank, and the snorkel is molded of the same material as the collector is or is subjected to the same surface reforming treatment as the collector is, so that the snorkel is equivalent in wettability to the collector.

2. A collector type writing instrument including: a point assembly with a writing point at a tip thereof, an ink tank for storing a low viscosity ink in a free-state ink condition, an ink feeder portion extended from the ink tank to the point assembly, and a collector disposed between the ink tank and the point assembly as an adjuster element for storing ink within a plurality of grooves when an inner pressure is adjusted, the writing instrument characterized in that:

the ink tank is formed therein with a snorkel having, integrally or as a separate part, a sectioning portion for substantially separating the ink tank without an ink conduit into a front tank and a rear tank, and a vent portion for establishing air communication between the front and rear spaces divided by the sectioning portion, the ink conduit is sized so as to be more unlikely to pass air than the vent portion does, and is formed in the sectioning portion, an inner wall of the ink tank, or both of the sectioning portion and the inner wall of the ink tank, the vent portion of the snorkel allows an air bubble to pass through, and has a front opening arranged at a rear end side of the collector and a rear opening arranged at a approximate center of, or at a position more rearward than, the ink tank, and the snorkel is molded of the same material as the ink tank or is subjected to a surface reforming treatment as the ink tank is, so that the snorkel is equivalent in wettability to the ink tank.

3. The collector type writing instrument according to claim 2, further comprising:

an ink absorber which is disposed inside the ink tank and is capable of storing ink and connects with a center core or a collector core which leads ink from the ink tank to the point assembly, wherein the ink absorber has an unabsorbent cladding and is configured so that its length at least reaches to a position more rearward than the approximate center of the ink tank and so as to be able to absorb ink through front and rear openings, and, the cladding of the ink absorber is molded of the same material as the snorkel or the ink tank is or is subjected to the same surface treatment as the snorkel or the ink tank is, so that the cladding of the ink absorber is equivalent in wettability to the snorkel or the ink tank.

4. The collector type writing instrument according to claim 1, further comprising:

an ink absorber which is disposed inside the ink tank and is capable of storing ink and connects with a center core or a collector core which leads ink from the ink tank to the point assembly, wherein the ink absorber has an unabsorbent cladding and is configured so that its length at least reaches to a position more rearward than the approximate center of the ink tank and so as to be able to absorb ink through front and rear openings, and, the cladding of the ink absorber is molded of the same material as the snorkel or the ink tank is or is subjected to the same surface treatment as the snorkel or the ink tank is, so that the cladding of the ink absorber is equivalent in wettability to the snorkel or the ink tank.

* * * * *